(12) United States Patent
Arisaka et al.

(10) Patent No.: US 6,773,745 B2
(45) Date of Patent: Aug. 10, 2004

(54) METHOD OF PRODUCING MAGNETIC RECORDING MEDIUM

(75) Inventors: Yuichi Arisaka, Miyagi (JP); Junichi Tachibana, Miyagi (JP); Takuya Ito, Miyagi (JP); Yoh Iwasaki, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/219,020

(22) Filed: Aug. 14, 2002

(65) Prior Publication Data

US 2003/0054202 A1 Mar. 20, 2003

(30) Foreign Application Priority Data

Aug. 20, 2001 (JP) ..................................... P2001-248874

(51) Int. Cl.$^7$ ................................................. B05D 5/12
(52) U.S. Cl. ........................ 427/130; 427/132; 427/250; 427/255.28; 427/255.31; 427/381.1
(58) Field of Search ................................. 427/130, 132, 427/250, 255.28, 255.31, 381.1

(56) References Cited

U.S. PATENT DOCUMENTS 5,239,435 A * 8/1993 Jeffers et al. ............... 360/126
5,864,450 A * 1/1999 Chen et al. .................. 360/319
6,166,880 A * 12/2000 Kobayashi et al. .......... 360/126
6,473,265 B1 * 10/2002 Zhou et al. .................. 360/126

* cited by examiner

Primary Examiner—Bernard Pianalto
(74) Attorney, Agent, or Firm—Robert J. Depke; Holland & Knight LLP

(57) ABSTRACT

A method of producing a magnetic recording medium comprising the step of forming a magnetic layer on a non-magnetic base film running at a constant speed by continuous oblique evaporation depositing metal vapor of volatilized metal incident obliquely to a surface of the non-magnetic base film, wherein the evaporation is conducted at a film forming rate, defined as an average deposition rate of the magnetic layer at a part of the non-magnetic base film exposed to the incident metal vapor, of not less than a predetermined rate to form an internal microstructure of the magnetic layer comprising columns each having a diameter of not more than about 15 nm constituted by magnetic particles having a size of not more than about 10 nm connected in chains in a direction substantially perpendicular to the magnetic layer and non-magnetic particles packed between the columns and separating the columns from each other, and a magnetic recording medium produced by the above method.

6 Claims, 4 Drawing Sheets

METHOD OF PRODUCING MAGNETIC RECORDING MEDIUM

BACKGROUND OF THE INVENTION

This application claims priority to Japanese Patent Application Number JP2001-248874 filed Aug. 20, 2001 which is incorporated herein by reference.

1. Field of the Invention

The present invention relates to a method of producing a magnetic recording medium and a magnetic recording medium, more particularly relates to a method of producing a magnetic recording medium of a metal magnetic thin film type including columnar structure magnetic particles and non-magnetic particles in a magnetic layer.

2. Description of the Related Art

In magnetic recording systems such as video tape recorders, for the purpose of improving picture quality, a greater increase in recording density has been strongly demanded. As a magnetic recording medium increased in recording density, a so-called "metal magnetic thin film type magnetic recording medium" wherein a ferromagnetic material composed of a metal or alloy is deposited directly on a non-magnetic base film to form a magnetic layer has been proposed and is attracting attention.

Here, as an alloy of a ferromagnetic material, a Co—Ni alloy, a Co—Cr alloy, a Co—O alloy, or other alloy can be mentioned. A film of the ferromagnetic material is formed on the non-magnetic base film by plating or a vacuum thin film deposition method. As a vacuum thin film deposition method, vacuum evaporation, sputtering, ion plating, etc. can be mentioned. As the non-magnetic base film, a polyester film, polyamide or polyimide film, etc. can be mentioned.

A metal magnetic thin film type magnetic recording medium is superior in coercive force, residual magnetization, squareness ratio, etc. and also in electromagnetic conversion characteristics at a short wavelength compared with a coating type magnetic recording medium having a magnetic layer formed by coating a magnetic coating material. Also, since the ferromagnetic material is deposited directly on the film, the magnetic layer can be made extraordinarily thin. Due to this, the demagnetization of recording and output loss due to thickness during reproduction can be reduced significantly so that good electromagnetic conversion characteristics can be obtained.

Further, there is no need to mix a non-magnetic binder and additives in the magnetic layer, so the filling density of the magnetic material is increased and the magnetic flux density can be increased. In this way, a metal magnetic thin film type magnetic recording medium has many advantages.

To further improve the electromagnetic conversion characteristics of a thin film type magnetic recording medium and obtain a higher output, so-called "vacuum oblique evaporation" for depositing a ferromagnetic metal material by making it obliquely strike the non-magnetic base film has been proposed.

A metal evaporated type magnetic tape (metal evaporated tape) having a magnetic layer formed by vacuum evaporation has a high manufacturing efficiency and stable characteristics. Due to this, metal evaporated tapes have already been put into practical use as high-band 8 mm tape, consumer digital video tape, and computer data recording tape such as AIT and Mammoth.

In obliquely evaporated tape, it is known that the magnetic particles form a plurality of columnar clusters, that is, columns, and that these columns are arranged on the non-magnetic base film. The longitudinal axes of the columns are slightly tilted from the direction perpendicular to the surface of the magnetic layer. Generally, such a structure of a magnetic layer is called a "columnar structure". Up to now, as a columnar structure, one wherein the magnetic particles and non-magnetic particles randomly aggregate to form columns has been known. In columns where the magnetic particles and non-magnetic particles randomly aggregate, the diameter of the magnetic particles is generally about 10 nm.

For example, when forming a Co—O thin film as the magnetic layer, the magnetic particles are Co particles (Co crystallites) while the non-magnetic particles are CoO particles (CoO crystallites) containing oxygen at a high content. CoO is known as an antiferromagnetic material having a Néel temperature of about 300 K. The Néel temperature is extremely close to room temperature, so the magnetic anisotropy of Co is not influenced significantly.

The magnetic particles and non-magnetic particles are can be distinguished by high resolution observation using electron beam diffraction or a transmission type electron microscope. It is also possible to analyze the microstructure formed by these particles by combining the above methods and methods of elemental mapping. Here, as methods of elemental mapping, energy dispersive X-ray (EDX) microanalysis and energy-filtered electron microscope analysis can be mentioned (see *Digests of the 24th Annual Conference on Magnetics in Japan* (2000) (12pA-14, p. 22), and the *Journal of The Japan Institute of Metals*, vol. 65 (5), 2001 "Microstructural Analysis of Obliquely Evaporated Co—CoO Tape Using TEM and EELS".)

Summarizing the problem to be solved by the invention, to achieve high density recording, a higher output of reproduction and low noise medium are required. To satisfy these requirements in an obliquely evaporated tape, it is necessary to suitably control the diameter and shape of the magnetic particles in the magnetic recording medium and the columnar shape.

The electromagnetic conversion characteristic S/N is improved by making the size of the magnetic particle smallers and by reducing variation in the particle size. However, no method has yet been found for forming a magnetic layer having small size magnetic particles and less variation in particle size. A magnetic recording medium controlled in size and variation of size of the magnetic particles forming the columnar structure has therefore been desired.

SUMMARY OF THE INVENTION

An object of the present invention is to provide a method of producing a magnetic recording medium able to control the size and variation in size of magnetic particles forming the columnar structure.

Another object of the present invention is to provide a magnetic recording medium having a magnetic layer reduced in the size and variation in size of the columnar structure magnetic particles.

According to a first aspect of the present invention, there is provided a method of producing a magnetic recording medium comprising the step of forming a cobalt-oxygen (Co—O) magnetic layer on a non-magnetic base film running at a constant speed by continuous oblique evaporation depositing metal vapor of volatilized cobalt incident obliquely to a surface of the non-magnetic base film, wherein said evaporation is conducted at a film forming rate, defined as an average deposition rate of the magnetic layer at a part of the non-magnetic base film exposed to the incident metal vapor, of not less than 0.5 μm/s to form an internal microstructure of the magnetic layer comprising a plurality of columns each having a diameter of not more than about 15 nm constituted by magnetic particles of Co crystallites having a size of not more than about 10 nm connected in chains in a direction substantially perpendicular to the magnetic layer and non-magnetic particles of CoO crystallites packed between the columns and separating the columns from each other.

Preferably, crystals of the magnetic particles are oriented in a longitudinal direction of the columns and the size of the magnetic particles is a substantially minimum size within a range where the magnetic particles do not exhibit super paramagnetism.

Preferably, a plurality of the magnetic layer are stacked.

Preferably, the method further comprises the step of forming a protective film of the magnetic layer on the magnetic layer.

Preferably, an incident angle of the metal vapor to the surface of the non-magnetic base film is restricted by using one or more masks provided with an opening through which the metal vapor passes.

More preferably, the minimum incident angle of the metal vapor to the surface of the non-magnetic base film is 45° to 60°.

According to a second aspect of the present invention there is provided a method of method of producing a magnetic recording medium comprising the step of forming a magnetic layer on a non-magnetic base film running at a constant speed by continuous oblique evaporation depositing metal vapor of volatilized metal magnetic material incident obliquely to a surface of the non-magnetic base film, wherein said evaporation is conducted at a film forming rate, defined as an average deposition rate of the magnetic layer at a part of the non-magnetic base film exposed to the incident metal vapor, of not less than a predetermined rate to form an internal microstructure of the magnetic layer comprising a plurality of columns each having a diameter of not more than about 15 nm constituted by magnetic particles having a size of not more than about 10 nm connected in chains in a direction substantially perpendicular to the magnetic layer and non-magnetic particles packed between the columns and separating the columns from each other.

Preferably, crystals of the magnetic particles are oriented in a longitudinal direction of the columns and the size of the magnetic particles is a substantially minimum size within a range where the magnetic particles do not exhibit super paramagnetism.

Preferably, the step of forming the magnetic layer comprises the step of making the magnetic layer a partially oxidized film of the metal magnetic material by supplying oxygen during deposition of the metal vapor on the non-magnetic base film.

According to a third aspect of the present invention there is provided a magnetic recording medium comprising a non-magnetic base film and a cobalt-oxygen (Co—O) magnetic layer formed on the non-magnetic base film by evaporation, said magnetic layer having an internal microstructure comprising a plurality of columns each having a diameter of not more than about 15 nm constituted by magnetic particles of Co crystallites having a size of not more than about 10 nm connected in chains in a direction substantially perpendicular to the magnetic layer and non-magnetic particles of CoO crystallites packed between the columns and separating the columns from each other.

According to a fourth aspect of the present invention there is provided a magnetic recording medium comprising a non-magnetic base film and a magnetic layer formed on the non-magnetic base film by evaporation, said magnetic layer having an internal microstructure comprising a plurality of columns each having a diameter of not more than about 15 nm constituted by magnetic particles having a size of not more than about 10 nm connected in chains in a direction substantially perpendicular to the magnetic layer and non-magnetic particles packed between the columns and separating the columns from each other.

BRIEF DESCRIPTION OF THE DRAWINGS

These and other objects and features of the present invention will become clearer from the following description of preferred embodiments given with reference to the accompanying drawings, in which.

DESCRIPTION OF THE PREFERRED EMBODIMENTS

Below, preferred embodiments of a method of producing a magnetic recording medium and a magnetic recording medium of the present invention will be described with reference to the accompanying drawings.

Figure 1:
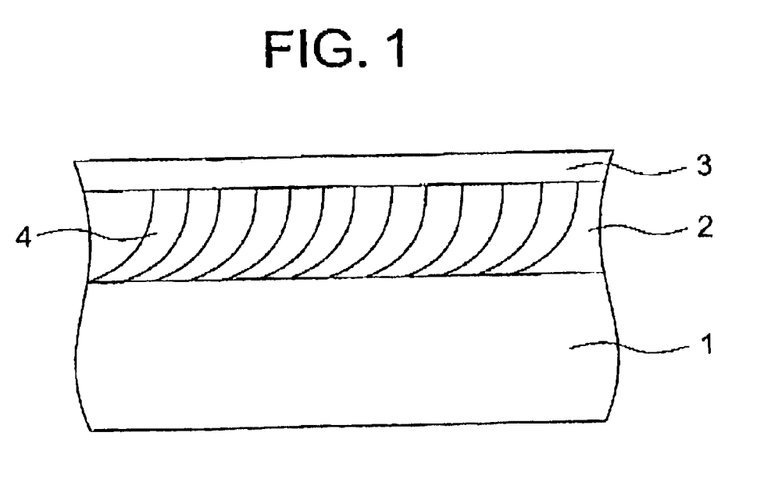
FIG. 1 is a sectional view of a magnetic recording medium of the present invention.

FIG. 1 is a sectional view of a magnetic recording medium produced by the method of producing a magnetic recording medium of a preferred embodiment. As shown in FIG. 1, a non-magnetic base film 1 is formed with a magnetic layer 2. A protective film 3 is formed on the magnetic layer 2.

The magnetic layer 2 is composed of magnetic particles forming columns 4 and non-magnetic particles separating the columns 4 formed by the magnetic particles. The columns 4 are comprised of chains of magnetic particles. The columns 4 are not more than about 15 nm in diameter, preferably about 5 to 10 nm.

To increase the recording density and reduce noise, the average size of the ferromagnetic particles is preferably not more than 10 nm, more preferably about 3 to 6 nm. If making the ferromagnetic particles further smaller, super paramagnetism is exhibited and the residual magnetization disappears. The particle size where ferromagnetic particles exhibit super paramagnetism can be calculated theoretically using magnetic anisotropy. For example, Co particles exhibit super paramagnetism and are unsuitable for magnetic recording at a size of about 2.6 nm and less.

When forming the magnetic layer 2 by oblique vacuum evaporation, the vapor of the metal magnetic material does not always reach the non-magnetic base film 1 at a constant incident angle. The incident angle changes during deposition of the magnetic layer. Therefore, the columns of the ferromagnetic particles are not straight but slightly bent. It is preferable that the crystals of the ferromagnetic particles be oriented to within 20° from the c-axial direction of the ferromagnetic particles in the columns.

When reproducing a recorded signal from the magnetic recording medium by an anisotropic magnetoresistive (AMR) head, it is preferable that the product (Mr·δ) of residual magnetization Mr of the magnetic layer 2 and thickness δ of the magnetic layer 2 be 7 to 25 mA. When reproducing a signal by a giant magnetoresistive (GMR) head, it is preferable that the product Mr·δ be 3 to 15 mA.

When reproducing a recorded signal from the magnetic recording medium by an AMR head, the thickness δ of the magnetic layer 2 is set to not more than 120 nm, preferably 50 to 80 nm. When reproducing it by a GMR head, the thickness δ is set to not more than 80 nm, preferably 20 to 40 nm.

As the material of the non-magnetic base film 1 of the magnetic recording medium shown in FIG. 1, a polymer material such as a polyester, polyolefin, cellulose derivative, vinyl resin, polyimide, polyamide, polycarbonate, etc. can be used.

Also, as the metal magnetic material forming the magnetic layer 2, a ferromagnetic metal such as Fe, Co, or Ni, a Co—Ni alloy, Fe—Co alloy, Fe—Ni alloy, Co—Pt alloy, Co—Ni—Pt alloy, Fe—Co—Ni alloy, Fe—Ni—B alloy, Fe—Co—B alloy, Fe—Co—Ni—B alloy and Co—Cr alloy, etc. can be mentioned.

In addition, when forming the magnetic layer 2 by vacuum oblique evaporation using the above metal magnetic material as a source of evaporation, oxygen gas can be added to the evaporation atmosphere to make the magnetic layer an oxygen-containing film such as a Co—O film or Co—Ni—O film. Due to this, the crystal particles in the magnetic layer are miniaturized and noise caused by the recording medium is lowered.

The oxygen gas is introduced to the evaporation atmosphere via one or more oxygen gas conduits. It is also possible to reduce the size and variation in size of the magnetic particles in the magnetic layer by adjusting the positions and directions of the oxygen gas conduits.

It is also possible to provide a not-illustrated appropriate barrier layer between the non-magnetic base film 1 and magnetic layer 2. As the barrier layer, for example a Cr thin film, $SiO_2$ film, or other layer composed of a non-magnetic material is used.

Also, it is possible to form a protective film 3, a lubricating layer containing a lubricant, etc. on the magnetic layer 2. As the material of the protective film 3, graphite, diamond-like carbon (DLC), diamond, or other carbon, $SiO_2$, etc. can be used. From the viewpoint of the strength of the thin film, carbon or DLC is preferable.

Figure 2:
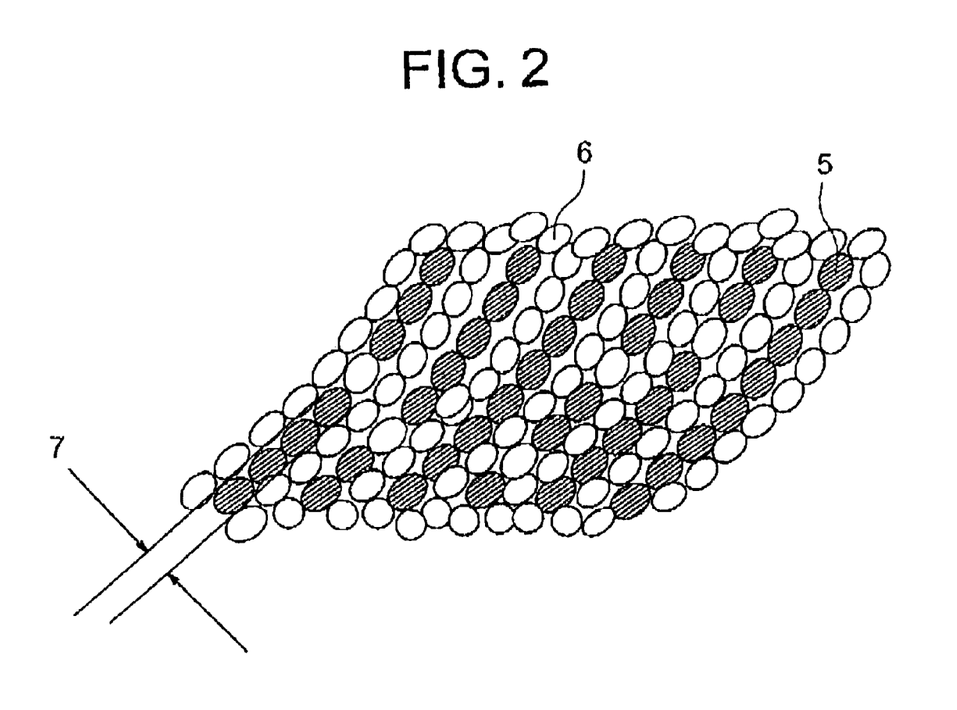
FIG. 2 is a schematic view of the internal microstructure at a cross-section of the magnetic layer of the magnetic recording medium of FIG. 1.

FIG. 2 is a schematic view of a cross-section of the magnetic layer 2 of the magnetic recording medium shown in FIG. 1. A sectional sample of the magnetic recording medium was prepared by ultramicrotomy and observed by a transmission type electron microscope. The obtained high resolution image was processed by Fourier transform to separate the magnetic particles (Co crystallites) and non-magnetic particles (CoO crystallites). As a result, the columnar structures as shown in FIG. 2 were observed.

As shown in FIG. 2, the magnetic particles 5 are arranged in a plurality of lines separated by non-magnetic particles 6. The particle size of the magnetic particles 5 is distributed over a range from 3 to 7 nm, and the average particle size is about 5 nm. The diameter 7 of the columns formed by the magnetic particles 5 is from 5 to 8 nm.

Figure 3:
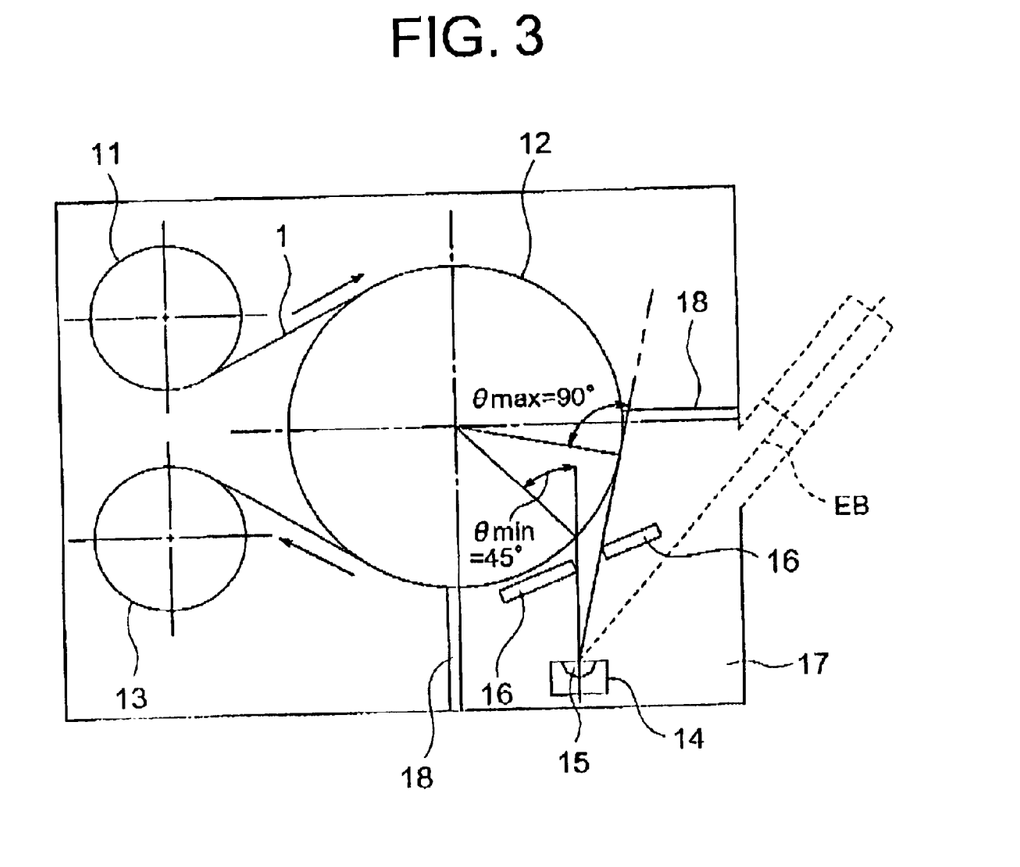
FIG. 3 is a schematic view of an evaporation system able to be used for the method of producing a magnetic recording medium of the present invention.

FIG. 3 is a schematic view of an evaporation system used for forming a magnetic layer in the method of forming a magnetic recording medium of the present embodiment. As shown in FIG. 3, a non-magnetic base film 1 is fed from a supply reel 11. The magnetic layer is obliquely evaporated on the non-magnetic base film 1 on a cooling drum 12. The cooling drum 12 is cooled to for example about −20° C. The non-magnetic base film 1 on to which the magnetic layer is evaporated is taken up by a take-up reel 13.

An evaporation source 15 in a crucible 14 is exposed to an electron beam EB from a not-shown electron gun to volatilize the evaporation source 15. As the evaporation source 15, the above described various metal magnetic materials are used. The metal magnetic material is changed to a vapor which then passes through an opening of a mask 16 and deposits on the non-magnetic base film 1 on the cooling drum 12.

Since the mask 16 is provided, the metal magnetic material reaches the non-magnetic base film 1 at a predetermined incident angle. FIG. 3 shows an example of an arrangement of the mask 16 making the minimum incident angle $\theta_{min}$ 45° and making the maximum incident angle $\theta_{max}$ 90°. According to the method of producing a magnetic recording medium of the present embodiment, the mask 16 is preferably arranged so as to make the minimum incident angle $\theta_{min}$ 45° to 60°. Due to this, the particle size and variation of size of the magnetic particles deposited on the non-magnetic base film 1 can be reduced.

The volatilized metal magnetic material outside of the predetermined range of the incident angle to the non-magnetic base film 1 is deposited on the surface of the mask 16 at the evaporation source 15 side. If necessary, a plurality of masks are provided between the evaporation source 15 and cooling drum 12.

The evaporation system is provided with a separation wall 18 composed of for example a metal so as to separate the portion of a pressure of about $5 \times 10^{-1}$ to $10^{-2}$ Pa where the supply reel 11 and take-up reel 13 are provided from the further reduced pressure evaporation atmosphere 17. The evaporation atmosphere 17 is evacuated by a not shown vacuum pump to a pressure of for example about $1 \times 10^{-1}$ to $1 \times 10^{-3}$ Pa.

In the method of producing a magnetic recording medium of the present invention, the non-magnetic base film 1 passes through the evaporation atmosphere 17 at a constant speed along with rotation of the cooling drum 12. The running speed of the non-magnetic base film 1 is defined as the tape line speed.

When evaporated obliquely as shown in FIG. 3, along with the rotation of the cooling drum 12, the incident angle at any one point on the non-magnetic base film 1 changes. Also, a spread occurs in the density of the volatilized metal passing through the opening of the mask 16. Therefore, while that point on the non-magnetic base film 1 passes through the evaporation atmosphere 17, the rate of deposition of the magnetic layer changes.

Therefore, the average rate of film formation from when starting evaporation on a certain point on the non-magnetic base film 1 until the end of evaporation at that point is defined as the film forming rate. This rate is equal to the thickness of the magnetic layer divided by the time of vacuum evaporation on that point on the non-magnetic base film 1. The time of vacuum evaporation on any one point of the non-magnetic base film 1 is determined by the tape line speed and positions of the mask 16 and its opening. A power of the electron beam EB is changed to change the film forming rate.

According to the method of producing a magnetic recording medium of the present embodiment, it is preferable to make the film forming rate of the magnetic layer not less than 0.5 µm/s, more preferably not less than 1.0 µm/s. If increasing the film forming rate, it is preferable to increase the tape line speed and amount of oxygen introduced too. Since the film forming rate depends on the power of the electron beam, the film forming rate at the maximized power of the electron beam becomes the upper limit of the film forming rate.

Below, the method of producing a magnetic recording medium of the present embodiment will be explained with reference to Examples 1 to 13.

EXAMPLE 1

A magnetic tape shown in FIG. 1 was produced under the following conditions. A polymer film was used as the non-magnetic base film 1. A Co—O magnetic layer 2 was formed on the polymer film by oblique vacuum evaporation. The thickness of the magnetic layer 2 was 80 nm.

In the oblique vacuum evaporation, the incident angle of the metal vapor to the surface of the non-magnetic base film was made 45°, the tape line speed 30 m/min, an oxygen feed of 0.3 slm, and a vacuum pressure of the evaporation atmosphere during evaporation $7.0 \times 10^{-2}$ Pa. The vacuum pressure of the evaporation atmosphere during evaporation was the same in all of the following examples. The film forming rate of the magnetic layer 2 was made 0.3 µm/s.

After this, DLC was deposited by chemical vapor deposition (CVD) to form a protective film 3 on the magnetic layer 2. The protective film 3 was formed in the same manner in all of the following examples.

Figure 4:
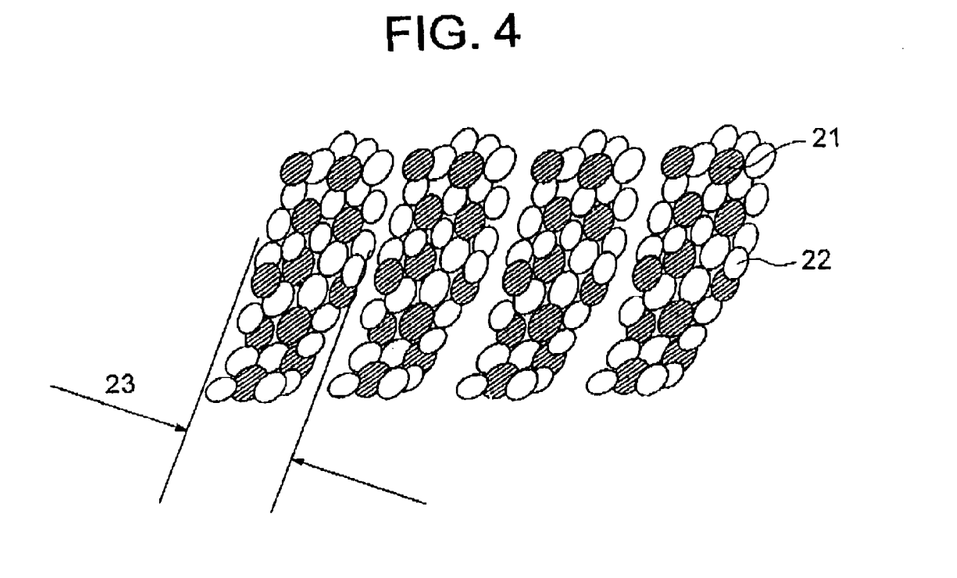
FIG. 4 is a schematic view of comparative examples (Examples 1 and 8) of the magnetic recording medium of the present invention.

A sectional sample of Example 1 was prepared by ultramicrotomy and observed by a TEM. As a result, the columnar internal structure as shown in FIG. 4 was identified. The columnar internal structure of Example 1 was different from the columnar internal structure shown in FIG. 2 wherein the magnetic particles lay substantially in one line.

In Example 1, as shown in FIG. 4, a column is constituted by a random cluster of magnetic particles 21 and non-magnetic particles 22. No chains of the magnetic particles 21 were observed. The size of the magnetic particles 21 was distributed over a range of 5 to 8 nm. The column diameter 23 was 20 to 30 nm or clearly larger than that of the columnar internal structure shown in FIG. 2.

The magnetic characteristics of the magnetic tape of Example 1 were a saturation magnetization Ms of 300 kA/m, a product (Mr·δ) of residual magnetization Mr and thickness δ of 17.3 mA, and coercive force Hc of 100 kA/m.

The electromagnetic conversion characteristics were evaluated from the reproduction output and signal-to-noise ratio (S/N ratio) when reproducing a signal by an AMR head at a recording wavelength of 0.5 µm. The reproduction output and S/N ratio of Example 1 are used as standards of the reproduction outputs and S/N ratios of Examples 2 to 7 and therefore are both 0 dB.

EXAMPLE 2

Except for making the film forming rate 0.5 µm/s and the tape line speed 50 m/min, a magnetic tape was produced in the same manner as Example 1. While oxygen was introduced in the evaporation atmosphere at one location in Example 1, oxygen was introduced in the evaporation atmosphere at two locations in Examples 2 to 7. The total oxygen feed at the two locations was 0.5 slm in Example 2.

Figure 5:
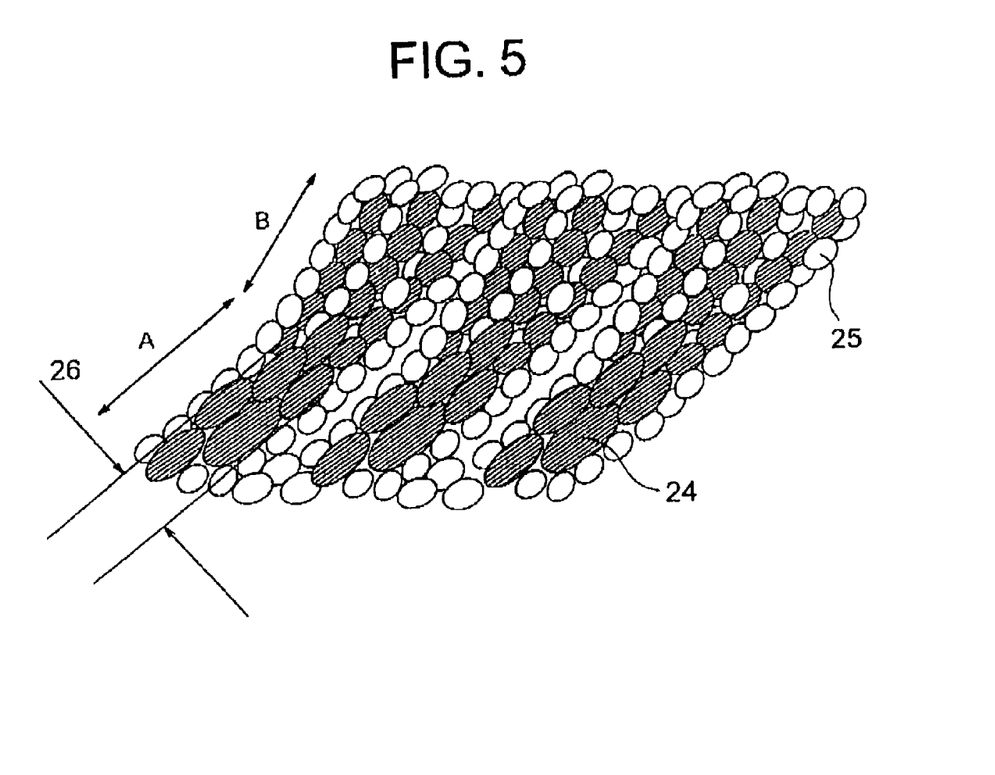
FIG. 5 is a schematic view of the internal microstructure at a cross-section of the magnetic layer of the magnetic recording medium of FIG. 1.

A sectional sample of Example 2 was prepared by ultramicrotomy and observed by a TEM. As a result, the columnar internal structure as shown in FIG. 5 was identified. In the part A lower than the substantial center of the magnetic layer (non-magnetic base film side), the magnetic particles 24 do not lie in lines but form clusters separated by the non-magnetic particles 25.

At the lower part A of the magnetic layer, the average size of the magnetic particles 24 was 8 nm, but magnetic particles 24 having a length of 20 nm were also observed. In the lower part A of the magnetic layer, compared with an upper part B (protective film side), the average size of the magnetic particles 24 was larger. The column diameter 26 at the lower part A was about 15 nm or larger than the column diameter at the upper part B.

On the other hand, in the upper part B, the size of the magnetic particles 24 was distributed over a range of 3 to 7 nm. The average particle size was about 5 nm. Also, the diameter of the column constituted by the magnetic particles 24 was 5 to 8 nm.

The magnetic characteristics of the magnetic tape of Example 2 were a saturation magnetization Ms of 303 kA/m, a product (Mr·δ) of residual magnetization Mr and thickness δ of 18.4 mA, and a coercive force Hc of 120 kA/m.

The electromagnetic conversion characteristics as indexed to Example 1 were a reproduction output of +1.5 dB and an S/N ratio of +1.3 dB.

EXAMPLE 3

Except for changing the incident angle of the metal vapor to the surface of the non-magnetic base film to 60°, the tape line speed to 80 m/min, the oxygen feed to 0.8 slm, and the film forming rate of the magnetic layer 2 to 0.8 µm/s in the oblique vacuum evaporation, a magnetic tape was produced in the same manner as Example 2.

A sectional sample of Example 3 was prepared by ultramicrotomy and observed by a TEM. As a result, a columnar internal structure as shown in FIG. 5 was identified. In the part A lower than the substantial center of the magnetic layer (non-magnetic base film side), the magnetic particles 24 do not lie in lines but form clusters separated by non-magnetic particles 25.

At the lower part A of the magnetic layer, the average size of the magnetic particles 24 was 8 nm, but magnetic particles 24 having a length of 20 nm were also observed. In the lower part A of the magnetic layer, compared with an upper part B of the magnetic layer, the average size of the magnetic particles 24 was larger. The column diameter 26 at the lower part A was about 15 nm or larger than the column diameter at the upper part B.

On the other hand, in the upper part B, the size of the magnetic particles 24 was distributed over a range of 3 to 7 nm, and the average particle size was about 5 nm. Also, the diameter of the column constituted by the magnetic particles 24 was 5 to 8 nm.

The magnetic characteristics of the magnetic tape of Example 3 were a saturation magnetization Ms of 318 kA/m, a product (Mr·δ) of residual magnetization Mr and thickness δ of 19.9 mA, and a coercive force Hc of 125 kA/m.

The electromagnetic conversion characteristics as indexed to Example 1 were a reproduction output of +3.0 dB and an S/N ratio of +2.2 dB.

EXAMPLE 4

Except for changing the tape line speed to 100 m/min, the oxygen feed to 1.0 slm, and the film forming rate of the magnetic layer 2 to 1.0 μm/s in the oblique vacuum evaporation, a magnetic tape was produced in the same manner as Example 2.

A sectional sample of Example 4 was prepared by ultra-microtomy and observed by a TEM. As a result, a columnar internal structure as shown in FIG. 2 was identified. The size of the magnetic particles 5 was distributed over a range of 3 to 7 nm, and the average particle size was about 5 nm. Also, the diameter of the column constituted by the magnetic particles 5 was 5 to 8 nm.

The magnetic characteristics of the magnetic tape of Example 4 were a saturation magnetization Ms of 318 kA/m, a product (Mr·δ) of residual magnetization Mr and thickness δ of 20.4 mA, and a coercive force Hc of 132 kA/m.

The electromagnetic conversion characteristics as indexed to Example 1 were a reproduction output of +3.5 dB and an S/N ratio of +2.8 dB.

EXAMPLE 5

Except for changing the tape line speed to 120 m/min, the oxygen feed to 1.2 slm, and the film forming rate of the magnetic layer 2 to 1.2 μm/s in the oblique vacuum evaporation, a magnetic tape was produced in the same manner as Example 2.

A sectional sample of Example 5 was prepared by ultra-microtomy and observed by a TEM. As a result, a columnar internal structure as shown in FIG. 2 was identified. The size of the magnetic particles 5 was distributed over a range of 3 to 7 nm, and the average particle size was about 5 nm. Also, the diameter of the column constituted by the magnetic particles 5 was 5 to 8 nm.

The magnetic characteristics of the magnetic tape of Example 5 were a saturation magnetization Ms of 326 kA/m, a product (Mr·δ) of residual magnetization Mr and thickness δ of 21.7 mA, and a coercive force Hc of 145 kA/m.

The electromagnetic conversion characteristics as indexed to Example 1 were a reproduction output of +3.8 dB and an S/N ratio of +3.0 dB.

EXAMPLE 6

Except for changing the tape line speed to 150 m/min, the oxygen feed to 1.5 slm, and the film forming rate of the magnetic layer 2 to 1.5 μm/s in the oblique vacuum evaporation, a magnetic tape was produced in the same manner as Example 2.

A sectional sample of Example 6 was prepared by ultra-microtomy and observed by a TEM. As a result, a columnar internal structure as shown in FIG. 2 was identified. The size of the magnetic particles 5 was distributed over a range of 3 to 7 nm, and the average particle size was about 5 nm. Also, the diameter of the column constituted by the magnetic particles 5 was 5 to 8 nm.

The magnetic characteristics of the magnetic tape of Example 6 were a saturation magnetization Ms of 334 kA/m, a product (Mr·δ) of residual magnetization Mr and thickness δ of 22.7 mA, and a coercive force Hc of 145 kA/m.

The electromagnetic conversion characteristics as indexed to Example 1 were a reproduction output of +4.0 dB and an S/N ratio of +3.1 dB.

EXAMPLE 7

Figure 6:
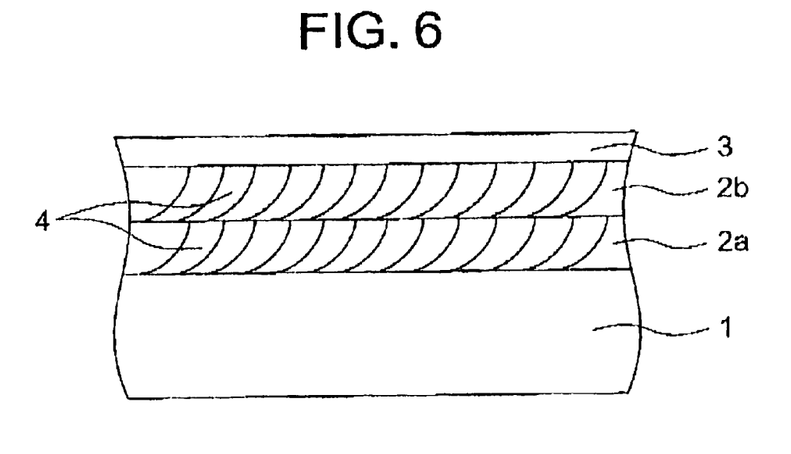
FIG. 6 is a sectional view of the magnetic recording medium of the present invention.

FIG. 6 is a cross-sectional view of a magnetic tape produced in Example 7. As shown in FIG. 6, a lower magnetic layer 2a and upper magnetic layer 2b were sequentially stacked on a non-magnetic base film 1. A protective film 3 was formed on the upper magnetic layer 2b.

Each of the lower magnetic layer 2a and upper magnetic layer 2b was composed of magnetic particles forming columns 4 and non-magnetic particles separating the columns 4. The columns 4 were comprised of chains of magnetic particles. The diameter of the columns 4 was about 15 nm or less, preferably about 5 to 10 nm.

The magnetic tape shown in FIG. 6 was produced under the following conditions. A polymer film was used as the non-magnetic base film 1. A Co—O lower magnetic layer 2a was formed by oblique vacuum evaporation on this polymer film. The thickness of the lower magnetic layer 2a was set at 40 nm.

In the oblique vacuum evaporation of the lower magnetic layer 2a, the tape line speed was set to 100 m/min and the oxygen feed to 1.0 slm. The film forming rate of the lower magnetic layer 2a was set to 1.0 μm/s.

Next, oblique vacuum evaporation was again performed to form the upper magnetic layer 2b on the lower magnetic layer 2a. The thickness of the upper magnetic layer 2b was set at 40 nm.

At this time, in the evaporation system shown in FIG. 3, the non-magnetic base film 1 was fed again from the supply reel 11 to deposit metal vapor in the same direction as when forming the lower magnetic layer 2a. The tape line speed, oxygen feed, and film forming rate were the same as when forming the lower magnetic layer 2a.

After this, DLC was deposited by CVD to form the protective film 3 on the upper magnetic layer 2b. The protective film 3 was formed in the same manner in all of the following examples.

Figure 7:
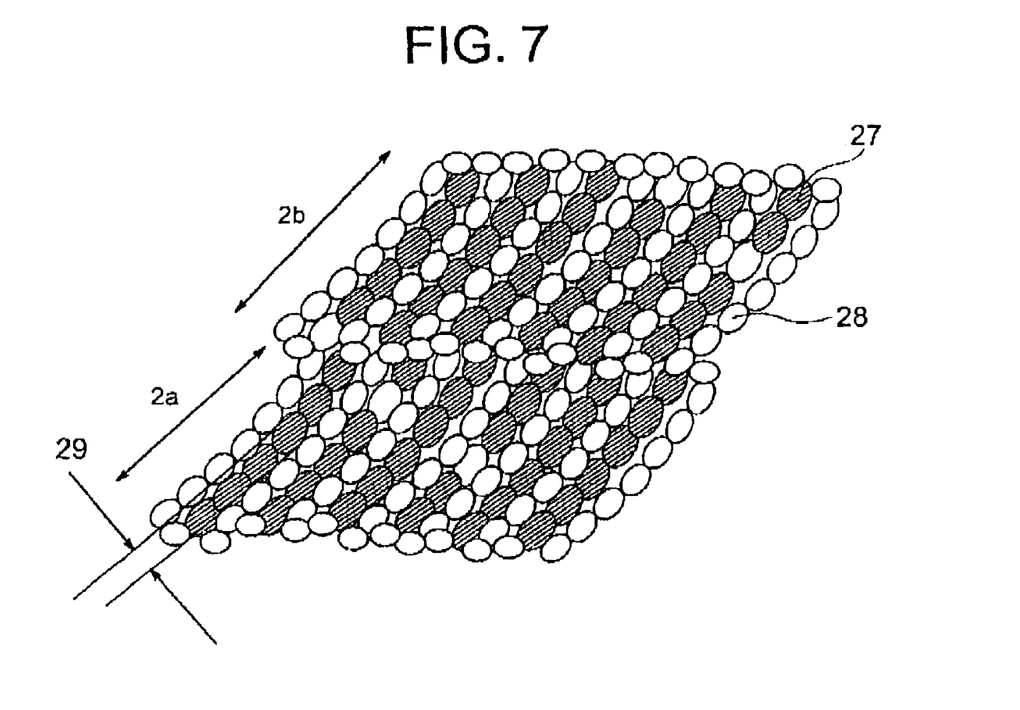
FIG. 7 is a schematic view of the internal microstructure at a cross-section of the magnetic layer of the magnetic recording medium of FIG. 6.

A sectional sample of Example 7 was prepared by ultra-microtomy and observed by a TEM. As a result, similar columnar internal structures as shown in FIG. 7 were identified in both of the lower magnetic layer 2a and upper magnetic layer 2b. In each of the magnetic layers 2a and 2b, the magnetic particles 27 lay in lines separated by non-magnetic particles 28. The size of the magnetic particles 27 was distributed over a range of 3 to 7 nm, and the average particle size was about 5 nm. The diameter 29 of the columns constituted by the magnetic particles 27 was 5 to 8 nm.

The magnetic characteristics of the magnetic tape of Example 7 were a saturation magnetization Ms of 334 kA/m, a product (Mr·δ) of residual magnetization Mr and thickness δ of 21.9 mA, and a coercive force Hc of 150 kA/m.

The electromagnetic conversion characteristics as indexed to Example 1 were a reproduction output of +4.2 dB and an S/N ratio of +3.2 dB.

EXAMPLE 8

Except for changing the thickness of the magnetic layer to 40 nm and the tape line speed to 60 m/min, a magnetic tape was produced in the same manner as Example 1. The tape line speeds in Examples 8 to 13 were double that of Examples 1 to 6.

A sectional sample of Example 8 was prepared by ultra-microtomy and observed by a TEM. As a result, a columnar internal structure as shown in FIG. 4 was identified.

As shown in FIG. 4, the columns were constituted by random clusters of the magnetic particles 21 and non-magnetic particles. No chains of the magnetic particles 21 wre observed. The size of the magnetic particles 21 was distributed over a range of 5 to 8 nm. The column diameter 23 was 20 to 30 nm or clearly larger than that of the columnar internal structure shown in FIG. 2.

The magnetic characteristics of the magnetic tape of Example 8 were a saturation magnetization Ms of 285 kA/m, a product (Mr·δ) of residual magnetization Mr and thickness δ of 8.6 mA, and a coercive force Hc of 85 kA/m.

The electromagnetic conversion characteristics were evaluated from the reproduction output and the S/N ratio when reproducing a signal by a GMR head at a recording wavelength of 0.5 μm. The reproduction output and S/N ratio of Example 8 were used as standards of the reproduction outputs and S/N ratios of Examples 9 to 13 and thus were both 0 dB.

EXAMPLE 9

Except for changing the thickness of the magnetic layer to 40 nm and the tape line speed to 100 m/min, a magnetic tape was produced in the same manner as Example 2.

A sectional sample of Example 9 was prepared by ultramicrotomy and observed by a TEM. As a result, a columnar internal structure as shown in FIG. 5 was identified. In the part A lower than the substantial center of the magnetic layer, the magnetic particles 24 do not lie in lines but form clusters separated by the non-magnetic particles 25.

At the lower part A of the magnetic layer, the average size of the magnetic particles 24 was 8 nm, but the magnetic particles 24 having a length of 20 nm were also observed. In the lower part A of the magnetic layer, compared with an upper part B of the magnetic layer, the average size of the magnetic particles 24 was larger. The column diameter 26 at the lower part A was about 15 nm or larger than the column diameter at the upper part B.

On the other hand, in the upper part B, the size of the magnetic particles 24 was distributed over a range of 3 to 7 nm, and the average particle size was about 5 nm. Also, the diameter of the columns constituted by the magnetic particles 24 was 5 to 8 nm.

The magnetic characteristics of the magnetic tape of Example 9 were a saturation magnetization Ms of 287 kA/m, a product (Mr·δ) of residual magnetization Mr and thickness δ of 8.9 mA, and a coercive force Hc of 104 kA/m.

The electromagnetic conversion characteristics as indexed to Example 8 were a reproduction output of +1.4 dB and an S/N ratio of +1.5 dB.

EXAMPLE 10

Except for changing the thickness of the magnetic layer to 40 nm and the tape line speed to 160 m/min, a magnetic tape was produced in the same manner as Example 3.

A sectional sample of Example 10 was prepared by ultramicrotomy and observed by a TEM. As a result, a columnar internal structure as shown in FIG. 5 was identified. In the part A lower than the substantial center of the magnetic layer A, the magnetic particles 24 do not lie in lines but form clusters separated by the non-magnetic particles 25.

At the lower part A of the magnetic layer, the average size of the magnetic particles 24 was 8 nm, but magnetic particles 24 having a length of 20 nm were also observed. In the lower part A of the magnetic layer, compared with an upper part B of the magnetic layer, the average size of the magnetic particles 24 was larger. The column diameter 26 at the lower part A was about 15 nm or larger than the column diameter at the upper part B.

On the other hand, in the upper part B, the size of the magnetic particles 24 was distributed over a range of 3 to 7 nm, and the average particle size was about 5 nm. Also, the diameter of the columns constituted by the magnetic particles 24 was 5 to 8 nm.

The magnetic characteristics of the magnetic tape of Example 10 were a saturation magnetization Ms of 305 kA/m, a product (Mr·δ) of residual magnetization Mr and thickness δ of 9.8 mA, and a coercive force Hc of 112 kA/m.

The electromagnetic conversion characteristics as indexed to Example 8 were a reproduction output of +3.0 dB and an S/N ratio of +2.5 dB.

EXAMPLE 11

Except for changing the thickness of the magnetic layer to 40 nm and the tape line speed to 200 m/min, a magnetic tape was produced in the same manner as Example 4.

A sectional sample of Example 11 was prepared by ultramicrotomy and observed by a TEM. As a result, a columnar internal structure as shown in FIG. 2 was identified. The size of the magnetic particles 5 was distributed over a range of 3 to 7 nm, and the average particle size was about 5 nm. Also, the diameter of the columns constituted by the magnetic particles 5 was 5 to 8 nm.

Thye magnetic characteristics of the magnetic tape of Example 11 were a saturation magnetization Ms of 307 kA/m, a product (Mr·δ) of residual magnetization Mr and thickness δ of 9.9 mA, and a coercive force Hc of 116 kA/m.

The electromagnetic conversion characteristics as indexed to Example 8 were a reproduction output of +3.5 dB and an S/N ratio of +2.9 dB.

EXAMPLE 12

Except for changing the thickness of the magnetic layer to 40 nm and the tape line speed to 240 m/min, a magnetic tape was produced in the same manner as Example 5.

A sectional sample of Example 12 was prepared by ultramicrotomy and observed by a TEM. As a result, a columnar internal structure as shown in FIG. 2 was identified. The size of the magnetic particles 5 was distributed over a range of 3 to 7 nm, and the average particle size was about 5 nm. Also, the diameter of the columns constituted by the magnetic particles 5 was 5 to 8 nm.

The magnetic characteristics of the magnetic tape of Example 12 were a saturation magnetization Ms of 311 kA/m, a product (Mr·δ) of residual magnetization Mr and thickness δ of 10.3 mA, and a coercive force Hc of 131 kA/m.

The electromagnetic conversion characteristics as indexed to Example 8 were a reproduction output of +3.7 dB and an S/N ratio of +3.1 dB.

EXAMPLE 13

Except for changing the thickness of the magnetic layer to 40 nm and the tape line speed to 300 m/min, a magnetic tape was produced in the same manner as Example 6.

A sectional sample of Example 13 was prepared by ultramicrotomy and observed by a TEM. As a result, a columnar internal structure as shown in FIG. 2 was identified. The size of the magnetic particles 5 was distributed over a range of 3 to 7 nm, and the average particle size was about 5 nm. Also, the diameter of the columns constituted by the magnetic particles 5 was 5 to 8 nm.

The magnetic characteristics of the magnetic tape of Example 13 were a saturation magnetization Ms of 316 kA/m, a product (Mr·δ) of residual magnetization Mr and thickness δ of 10.7 mA, and a coercive force Hc of 132 kA/m.

The electromagnetic conversion characteristics as indexed to Example 8 were a reproduction output of +3.9 dB and an S/N ratio of +3.2 dB.

The film forming conditions, magnetic characteristics, electromagnetic conversion characteristics, and average diameters of magnetic particles of the above Examples 1 to 13 are summarized in Table 1.

Next, single magnetic layers and double magnetic layers will be compared. In Example 4, a single magnetic layer was formed to a thickness of 80 nm by a 1.0 μm/s film forming rate. On the other hand, in Example 7, two magnetic layers were stacked to thicknesses of 40 nm each to give a total thickness of 80 nm by a 1.0 μm/s film forming rate.

Comparing Example 4 and Example 7, in magnetic characteristics, all of the saturation magnetization Ms, product (Mr·δ) of residual magnetization Mr and thickness δ, and coercive force Hc are higher in Example 7. Also, in elec-

TABLE 1

| Example | Film thickness (nm) | Tape line speed (m/min) | Oxygen feed (slm) | Film forming rate (μm/s) | Ms (kA/m) | Mr · δ (mA) | Hc (kA/m) | Reproduction output (dB) | S/N ratio (dB) | Average particle size (μm) |
|---|---|---|---|---|---|---|---|---|---|---|
| 1 | 80 | 30 | 0.3 | 0.3 | 300 | 17.3 | 100 | 0 | 0 | 5 to 8 |
| 2 | 80 | 50 | 0.5 | 0.5 | 303 | 18.4 | 120 | 1.5 | 1.3 | 3 to 7 |
| 3 | 80 | 80 | 0.8 | 0.8 | 318 | 19.9 | 125 | 3.0 | 2.2 | 3 to 7 |
| 4 | 80 | 100 | 1.0 | 1.0 | 318 | 20.4 | 132 | 3.5 | 2.8 | 3 to 7 |
| 5 | 80 | 120 | 1.2 | 1.2 | 326 | 21.7 | 145 | 3.8 | 3.0 | 3 to 7 |
| 6 | 80 | 150 | 1.5 | 1.5 | 334 | 22.7 | 145 | 4.0 | 3.1 | 3 to 7 |
| 7 | 40/40 | 100 | 1.0 | 1.0 | 334 | 21.9 | 150 | 4.2 | 3.2 | 3 to 7 |
| 8 | 40 | 60 | 0.3 | 0.3 | 285 | 8.6 | 85 | 0 | 0 | 5 to 8 |
| 9 | 40 | 100 | 0.5 | 0.5 | 287 | 8.9 | 104 | 1.4 | 1.5 | 3 to 7 |
| 10 | 40 | 160 | 0.8 | 0.8 | 305 | 9.8 | 112 | 3.0 | 2.5 | 3 to 7 |
| 11 | 40 | 200 | 1.0 | 1.0 | 307 | 9.9 | 116 | 3.5 | 2.9 | 3 to 7 |
| 12 | 40 | 240 | 1.2 | 1.2 | 311 | 10.3 | 131 | 3.7 | 3.1 | 3 to 7 |
| 13 | 40 | 300 | 1.5 | 1.5 | 316 | 10.7 | 132 | 3.9 | 3.2 | 3 to 7 |

First, Examples 1 to 6 where single magnetic layers are formed to a thickness of 80 nm will be compared. Looking at the columnar internal structure, when the film forming rate is 0.3 μm/s (Example 1) the columnar structure becomes the one as shown in FIG. 4 wherein magnetic particles and non-magnetic particles randomly gather. As opposed to this, when the film forming rate is 0.5 μm/s or more (Examples 2 to 6), the columnar internal structures where the magnetic particles lie chains as shown in FIGS. 2 and 5 are obtained.

In the examples of the film forming rate of 0.5 μm/s or more, when, the film forming rate is relatively low (Examples 2 and 3), the columns as a whole are not made thin uniformly and the size of the magnetic particles fluctuates as shown in FIG. 5.

As opposed to this, when increasing the film forming rate further (Examples 4 to 6), the magnetic particles lie in lines and fluctuation of the size of the magnetic particles is suppressed as shown in FIG. 2.

Looking at the magnetic characteristic, along with the increase in the film forming rate in the sequence of Examples 1 to 6, the saturation magnetization Ms, product Mr·δ of residual magnetization Mr and thickness δ, and coercive force Hc increase.

Also, looking at the electromagnetic conversion characteristics, along with the increase in the film forming rate in the sequence of Examples 1 to 6, the reproduction output and S/N ratio increase.

Note that the film forming rate cannot be increased to more than 1.5 μm/s because of the restrictions on the power of the electron beam.

As explained above, when making the film forming rate 0.5 μm/s or more, preferably 1.0 μm/s or more, the size of the magnetic particles in the magnetic layer and its fluctuation can be reduced and the magnetic characteristics and electromagnetic conversion characteristics of the magnetic recording medium can be improved.

tromagnetic conversion characteristics, both the reproduction output and S/N ratio are higher in Example 7.

As described above, when providing double magnetic layers, the magnetic characteristics and electromagnetic conversion characteristics of the magnetic recording medium can be improved. Further, in the same manner as a single magnetic layer, when increasing the film forming rate, the magnetic characteristics and electromagnetic conversion characteristics of the magnetic recording medium can be improved.

Next, Examples 8 to 13 where single magnetic layers are formed to a thickness of 40 nm will be compared. In the same manner as single magnetic layers having a thickness of 80 nm (Examples 1 to 6), when the film forming rate is 0.3 μm/s (Example 8), the columnar structure becomes the one as shown in FIG. 4 where magnetic particles and non-magnetic particles randomly gather. As opposed to this, when the film forming rate is 0.5 μm/s or more (Examples 9 to 13), a columnar internal structures where chains of the magnetic particles lie are formed as shown in FIGS. 2 and 5 are obtained.

In the examples of the film forming rate of 0.5 μm/s or more, when the film forming rate is relatively low (Examples 9 and 10), the columns as a whole are not made thin uniformly and the size of the magnetic particles fluctuates as shown in FIG. 5.

As opposed to this, when increasing the film forming rate further (Examples 11 to 13), the magnetic particles lie in lines and fluctuation of the size of the magnetic particles is suppressed as shown in FIG. 2.

Looking at the magnetic characteristic, along with an increase in the film forming rate in the sequence of Examples 8 to 13, the saturation magnetization Ms, product Mr·δ of residual magnetization Mr and thickness δ, and coercive force Hc increase.

Also, looking at the electromagnetic conversion characteristics, along with an increase of the film forming rate in the sequence of Examples 8 to 13, the reproduction output and S/N ratio increase.

Note that the film forming rate cannot be increased to more than 1.5 μm/s because of restrictions on the power of the electron beam.

As explained above, when making the film forming ratio 0.5 μm/s or more, preferably 1.0 μm/s or more, the size of the magnetic particles in the magnetic layer and its fluctuation can be reduced and the magnetic characteristics and electromagnetic conversion characteristics of the magnetic recording medium can be improved.

According to the method of producing a magnetic recording medium of this embodiment of the present invention, it is possible to reduce the size of the magnetic particles and its fluctuation and form a columnar internal structure of chains of magnetic particles by controlling the incident angle of metal vapor to the non-magnetic base film within a predetermined range and increasing the film forming rate of the magnetic layer.

Due to this, it becomes possible to improve the magnetic characteristics and electromagnetic conversion characteristics of a metal magnetic thin film type magnetic recording medium. Therefore, depending on the Mr·δ value, a high output and low noise magnetic tape particularly suitable for reproduction by AMR and GMR heads can be obtained.

The method of producing a magnetic recording medium of the present invention is not limited to the above embodiment. For example, the present invention can also be applied to the method of producting a magnetic recording medium reproduced by a head other than an AMR or GMR head.

Summarizing the effects of the present invention, according to the present invention, it is possible to reduce the size of the magnetic particles forming columnar internal structures and fluctuation of the particle size and thereby produce a magnetic recording medium having high magnetic characteristics and electromagnetic conversion characteristics.

Note that the present invention is not limited to the above embodiments and includes modifications within the scope of the claims.

What is claimed is:

1. A method of producing a magnetic recording medium comprising a step of forming a cobalt-oxygen (Co-O) magnetic layer over a non-magnetic base film running at constant speed by continuous oblique evaporation, depositing metal vapor of volatilized co It incident obliquely to a surface of the non-magnetic base film, wherein said evaporation is conducted at a film forming rate, defined as an average deposition rate of the magnetic layer at a part the non-magnetic base film exposed to the incident metal vapor, of not less than 0.5 μm/s to form an internal microstructure of the magnetic layer comprising:

a plurality of columns each having a diameter of not more than about 15 nm constituted by magnetic particles of Co crystallites having a size of not more than about 10 nm connected in chains in a direction substantially perpendicular to the magnetic layer and non-magnetic particles of CoO crystallites packed between the columns and separating the columns from each other.

2. A method of producing a magnetic recording medium as set forth in claim 1, wherein crystals of the magnetic particles are oriented in a longitudinal direction of the columns and the size of the magnetic particles is a substantially minimum size within a range where the magnetic particles do not exhibit super paramagnetism.

3. A method of producing a magnetic recording medium as set forth in claim 1, wherein a plurality of the magnetic layers are stacked.

4. A method of producing a magnetic recording medium as set forth in claim 1, further comprising the step of forming a protective film on the magnetic layer.

5. A method of producing a magnetic recording medium as set forth in claim 1, wherein an incident angle of the metal vapor to the surface of the non-magnetic base film is restricted by using one or more masks provided with an opening through which the metal vapor passes.

6. A method of producing a magnetic recording medium as set forth in claim 5, wherein the minimum incident angle of the metal vapor to the surface of the non-magnetic base film is 45 to 600°.

\* \* \* \* \*